United States Patent
Odachi et al.

(10) Patent No.: US 6,640,562 B2
(45) Date of Patent: Nov. 4, 2003

(54) AIR-CONDITIONING SYSTEM FOR VEHICLE AND ITS CONTROL METHOD

(75) Inventors: Yasuharu Odachi, Kariya (JP); Ken Suitou, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 91 days.

(21) Appl. No.: 10/039,530

(22) Filed: Jan. 4, 2002

(65) Prior Publication Data

US 2002/0104321 A1 Aug. 8, 2002

(30) Foreign Application Priority Data

Jan. 9, 2001 (JP) .......................... 2001-001688

(51) Int. Cl.[7] ................................ B60H 1/32
(52) U.S. Cl. ................... 62/133; 62/228.5; 62/236; 62/323.3
(58) Field of Search ................ 62/133, 228.5, 62/228.1, 228.4, 229, 230, 243, 244, 323.1, 323.3, 236, 196.1, 196.2, 196.3, 228.3, 323.4

(56) References Cited

U.S. PATENT DOCUMENTS

| | | | | |
|---|---|---|---|---|
| 4,862,700 A | * | 9/1989 | Suzuki | 62/228.5 |
| 5,893,272 A | * | 4/1999 | Hanselmann et al. | 62/133 |
| 6,230,507 B1 | * | 5/2001 | Ban et al. | 62/228.4 |
| 6,367,270 B2 | * | 4/2002 | Niimi et al. | 62/133 |

FOREIGN PATENT DOCUMENTS

| | | | | |
|---|---|---|---|---|
| JP | 11-324930 | 11/1999 | | F04B/49/00 |
| JP | 2000-142091 | 5/2000 | | B60H/1/32 |
| JP | 2000-230482 | 8/2000 | | F04B/35/00 |

* cited by examiner

Primary Examiner—Harry B. Tanner
(74) Attorney, Agent, or Firm—Morgan & Finnegan, LLP

(57) ABSTRACT

An air-conditioning system for a vehicle including a refrigerant circuit and an engine, has a compressor in the refrigerant circuit, a battery, an electric motor and a mechanism operative to controllably connect and disconnect a power transmitting path between the engine and the motor. The motor is connected to drive the compressor when energized by the battery. A first controller is operative to control the electric power supplied to the motor from the battery. A capacity control mechanism is responsive to the controller to maintain the discharge capacity of the compressor below a predetermined value upon starting the engine by the motor.

23 Claims, 2 Drawing Sheets

AIR-CONDITIONING SYSTEM FOR VEHICLE AND ITS CONTROL METHOD

BACKGROUND OF THE INVENTION

The present invention relates to an air-conditioning system that provides an engine driving a vehicle and a compressor driven by a motor due to electric power supplied from a battery.

Japanese Unexamined Patent Publication No. 2000-142091 discloses an air-conditioning system that has an engine, a crankshaft, a link gear, a starter motor for starting the engine, a pinion gear, a solenoid, an electromagnetic clutch, a controller for controlling the electromagnetic clutch and a compressor. The pinion gear is secured to an output shaft of the starter motor so as to move back and forth, and engages with the link gear linking with the crankshaft of the engine by energizing the solenoid upon starting the engine. As the starter motor rotates, the engine starts through the engaged gears. The output shaft of the starter motor is coupled to the compressor through the electromagnetic clutch, which is controlled for connecting and disconnecting due to an electric current supplied from the controller. The electromagnetic clutch is disconnected upon starting the engine, so that the starter motor is only used for starting the engine. Therefore, a load on the starter motor upon starting the engine is decreased. Meanwhile, while the starter motor and the engine are disconnected from each other, the starter motor drives the compressor after the electromagnetic clutch is connected. Therefore, the air-conditioning is ensured during a stop of the engine.

However, according to the above-mentioned structure, two coupling mechanisms are provided for decreasing the load, which acts on the starter motor while the air-conditioning system is operating during the stop of the engine, or which acts on the starter motor upon starting the engine. That is, one of the mechanisms is provided for connecting and disconnecting a power transmitting path between the starter motor and the engine, and the other is the electromagnetic clutch for connecting and disconnecting another power transmitting path between the starter motor and the compressor. Accordingly, such structure causes the system to become large and complicated.

SUMMARY OF THE INVENTION

The present invention addresses the above-mentioned problems traceable to two coupling mechanisms by simplifying the structure of the air-conditioning system.

According to the present invention, an air-conditioning system for a vehicle including a refrigerant circuit and an engine, has a compressor in the refrigerant circuit, a battery, an electric motor and a mechanism operative to controllably connect and disconnect a power transmitting path between the engine and the motor. The motor is connected to drive the compressor when energized by the battery. A first controller is operative to control the electric power supplied to the motor from the battery. A capacity control mechanism is responsive to the controller to maintain the discharge capacity of the compressor below a predetermined value upon starting the engine by the motor.

Accordingly, the discharge capacity of the compressor attains a value below the predetermined value upon starting the engine by the motor. Therefore, a load on the motor for driving the compressor attains a value below the predetermined value upon starting the engine by the motor. Thereby, without a coupling mechanism operative to controllably connect and disconnect another power transmitting path between the motor and the compressor, such as an electromagnetic clutch, the load on the motor is decreased upon starting the engine. Also, the maximum load on the motor may easily be decreased. As the load on the motor decreases, lifetime of the battery may lengthen. The motor may not undesirably stop due to shortage of the electric power supplied from the battery during a stop of the engine, such as an idle stop.

According to the present invention, a method for controlling an air-conditioning system for a vehicle including a refrigerant circuit and an engine, includes receiving a signal for starting the engine, maintaining the discharge capacity of a compressor in the refrigerant circuit below a predetermined value, supplying an electric motor operatively connected to the compressor with electric power, and starting the engine by the motor.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A first embodiment of an air-conditioning system for a vehicle according to the present invention will now be described with reference to FIG. 1. The left side and the right side in FIG. 1 correspond to the front end and the rear end, respectively.

Figure 1:
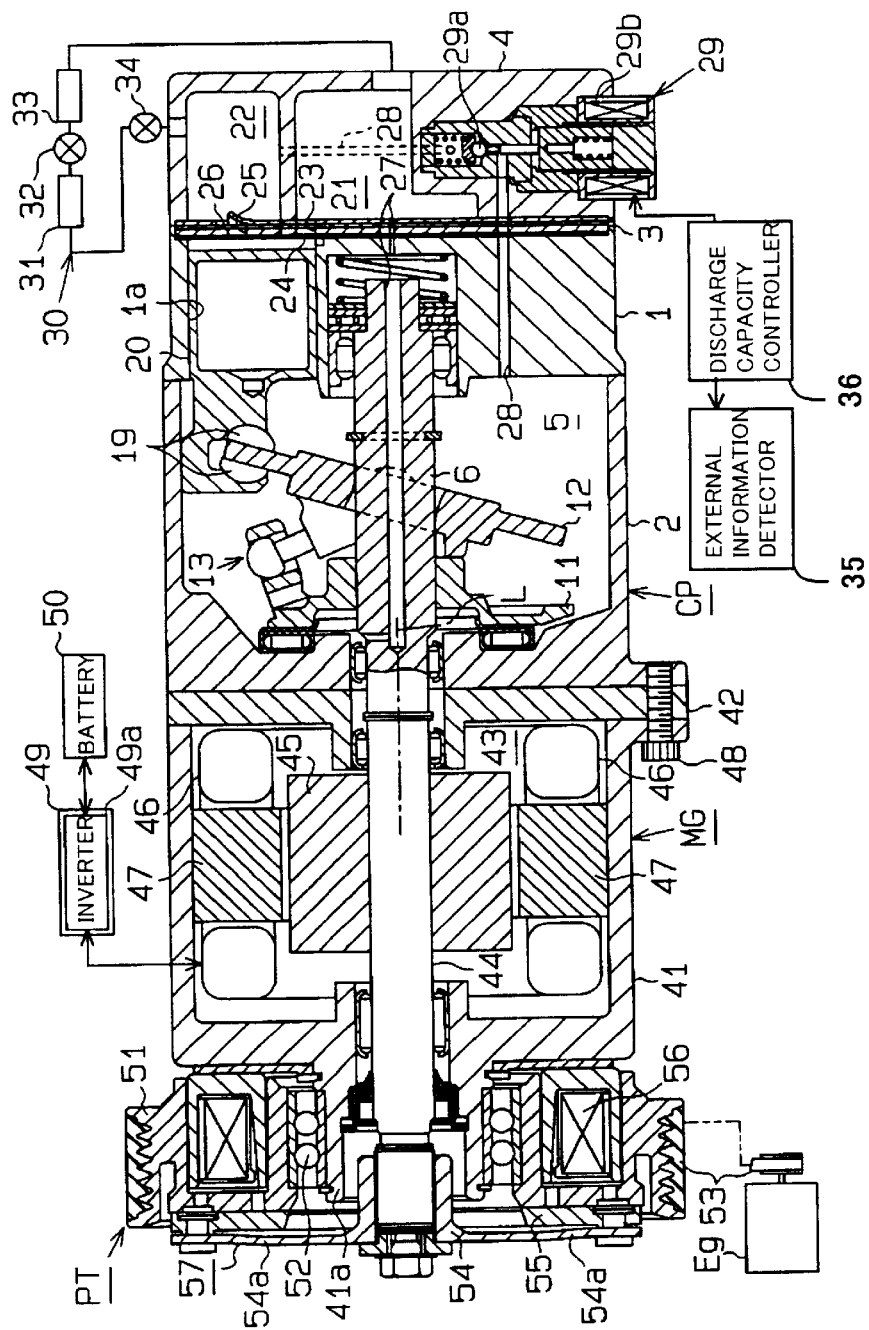
FIG. 1 is a schematic cross-sectional view illustrating an air-conditioning system for a vehicle according to a first embodiment of the present invention.

FIG. 1 shows an air-conditioning system for a vehicle. A motor generator MG is operatively coupled to an internal combustion engine Eg through a power transmitting mechanism PT. A swash plate type variable discharge capacity compressor CP constituting a refrigerant circuit (a refrigeration cycle) is operatively coupled to the engine Eg through the power transmitting mechanism PT and he motor generator MG. Namely, the compressor CP is disposed downstream to the motor generator MG in a power transmitting path such that the compressor CP is operatively coupled to the engine Eg. As shown in FIG. 1, the motor generator MG has a front housing 41 and a rear housing 42 connected to the rear end of the front housing 41. The front housing 41 and the rear housing 42 constitute a motor housing of the motor generator MG.

A motor chamber 43 is defined by the front housing 41 and the rear housing 42. A drive shaft 44 passing through the motor chamber 43 is rotatably supported by the motor housing, and extends through the motor housing. The drive shaft 44 is operatively coupled to the engine Eg through the power transmitting mechanism PT.

A magnet 45 is secured to the drive shaft 44 in the motor chamber 43 so as to rotate integrally with the drive shaft 44. A plurality of stator cores 47 wound with a coil 46 is fixed to an inner circumferential surface of the motor housing so as to surround the magnet 45.

A motor generator controller 49 includes an inverter 49a. The inverter 49a is interposed in a power supply circuit, which interconnects the coil 46 of the motor generator MG and the battery 50. The motor generator MG functions as a generator during operation of the engine Eg. Thereby, the controller 49 converts an alternating current generated by the motor generator MG to a direct current by means of the inverter 49a, and charges the battery 50. When a compartment of the vehicle needs to be cooled during a stop of the engine Eg, the controller 49 converts the direct current taken out of the battery 50 to the alternating current by means of the inverter 49a, and supplies the motor generator MG with electric power. Thereby, the motor generator MG functions as a motor, and drives the compressor CP. Accordingly, the compartment of the vehicle is cooled during the stop of the engine Eg.

As shown in FIG. 1, the compressor CP has a cylinder block 1, a front housing 2 connected to the front end of the cylinder block 1 and a rear housing 4 connected to the rear end of the cylinder block 1 via a valve plate assembly 3. The cylinder block 1, the front housing 2 and the rear housing 4 constitutes a housing of the compressor CP. The compressor CP is connected to the rear end of the rear housing 42 of the motor generator MG at its front end of the front housing 2.

In the first embodiment, the front housing 2 of the compressor CP, the front housing 41 and the rear housing 42 of the motor generator MG are screw-on together by a bolt 48. Accordingly, the compressor CP and the motor generator MG are united with each other, and the housing of the compressor CP may easily be attached and detached to the motor housing of the motor generator MG.

A crank chamber 5 or a control chamber is defined in a region surrounded by the cylinder block 1 and the front housing 2. A drive shaft 6 passing through the crank chamber 5 is rotatably supported by the housing. The front end of the drive shaft 6 extending through the front housing 2 is connected to the rear end of the drive shaft 44 by recess/projection engagement or by screw, or other detachable means, such that the drive shaft 6 integrally rotates with the drive shaft 44.

A lug plate 11 is fixed to the drive shaft 6 in the crank chamber 5 so as to rotate integrally with the drive shaft 6. A swash plate 12 is accommodated in the crank chamber 5, and is slidably tiltably supported by the drive shaft 6. A hinge mechanism 13 is interposed between the lug plate 11 and the swash plate 12. Accordingly, the swash plate 12 is coupled to the lug plate 11 through the hinge mechanism 13, and is supported by the drive shaft 6, so that the swash plate 12 synchronously rotates with the lug plate 11 and the drive shaft 6, and tilts relative to the drive shaft 6 by sliding in a direction of an axis L of the drive shaft 6.

A plurality of cylinder bores 1a (only one is shown in FIG. 1) is bored through the cylinder block 1 so as to surround the drive shaft 6. Single-headed pistons 20 are accommodated in the associated cylinder bores 1a so as to reciprocate. Front and rear openings of the cylinder bores 1a are closed by the pistons 20 and the valve plate assembly 3 respectively. Compression chambers, the volumes of which vary due to reciprocation of the pistons 20, are defined in the cylinder bores 1a, respectively. Each piston 20 is engaged with a periphery of the swash plate 12 through a pair of shoes 19. Accordingly, rotation of the swash plate 12 due to rotation of the drive shaft 6 is converted to the reciprocation of the pistons 20 through the shoes 19.

A suction chamber 21 and a discharge chamber 22 are defined between the valve plate assembly 3 and the rear housing 4. Suction ports 23 and suction valves 24 are formed at the valve plate assembly 3. Discharge ports 25 and discharge valves 26 are formed at the valve plate assembly 3. Refrigerant gas in the suction chamber 21 is drawn into the cylinder bores 1a (compression chambers) via the suction ports 23 and the suction valves 24 by moving pistons 20 from a top dead center toward a bottom dead center, respectively. The refrigerant gas drawn into the cylinder bores 1a is compressed up to a predetermined pressure value by moving the pistons from the bottom dead center toward the top dead center, and is discharged to the discharge chamber 22 via the discharge ports 25 and the discharge valves 26, respectively.

As shown in FIG. 1, the refrigerant circuit or the refrigeration cycle is constituted of the compressor CP and an external refrigerant circuit 30, which interconnects the discharge chamber 22 and the suction chamber 21 outside the compressor CP. For example, the external refrigerant circuit 30 is constituted of a condenser 31, an expansion valve 32 as a decompressor and an evaporator 33.

As shown in FIG. 1, pressure in the crank chamber 5 is adjusted or varied by a capacity control valve 29. Thereby, an inclination angle of the swash plate 12 is set for a maximum inclination angle, which is shown in FIG. 1, up to a minimum inclination angle, which is substantially zero degree relative to a plane perpendicular to the axis L of the so drive shaft 6.

The crank chamber 5 and the suction chamber 21 are interconnected via a bleed passage 27, and the discharge chamber 22 and the crank chamber 5 are interconnected via a supply passage 28. The capacity control valve 29 is interposed in the supply passage 28, and controls the position of a valve body 29a, or the opening size of a valve hole, due to the value of electric current supplied to a solenoid 29b. Thereby, the amount of discharged refrigerant gas in the discharge chamber 22 flowing into the crank chamber via the supply passage 28 is adjusted. The pressure in the crank chamber 5 is determined based on difference between the amount of discharged refrigerant gas flowing into the crank chamber 5 and the amount of refrigerant gas in the crank chamber 5 flowing into the suction chamber 21 via the bleed passage 27. Pressure difference between the pressure applied to the pistons 20 in the crank chamber 5 and pressure applied to the pistons 20 in the cylinder bores 1a varies in accordance with variation of the pressure in the crank chamber 5, and the inclination angle of the swash plate 12 varies. Consequently, strokes of the pistons 20 are adjusted, and the discharge capacity of the compressor CP is adjusted.

For example, as the opening size of the capacity control valve 29 decreases, the pressure in the crank chamber 5 decreases and the pressure difference between the pressure applied to the pistons 20 in the crank chamber 5 and the pressure applied to the pistons 20 in the cylinder bores 1a also decreases. Therefore, the inclination angle of the swash plate 12 increases, and the discharge capacity of the compressor CP increases. On the contrary, as the opening size of the capacity control valve 29 increases, the pressure in the crank chamber 5 increases, and the pressure difference between the pressure applied to the pistons 20 in the crank chamber 5 and the pressure applied to the pistons 20 in the cylinder bores 1a also increases. Therefore, the inclination angle of the swash plate 12 decreases, and the discharge capacity of the compressor CP decreases.

The opening size of the capacity control valve 29 is controlled due to the electric current supplied from a discharge capacity controller 36 based on such external information as an ON/OFF state of an air conditioner switch, a compartment temperature and a set temperature, which are detected by an external information detector 35. Besides, electric power supplied from the battery 50 is used for controlling the solenoid 29b of the capacity control valve 29 and the other electric equipments, which are not shown.

As shown in FIG. 1, a rotor 51 is rotatably supported by a boss 41a extending from the front end of the front housing 41 of the motor generator MG via an angular bearing 52. The rotor 51 is driven by the engine Eg through a belt 53, which winds around an outer circumference of the rotor 51. A hub 54 is fixed to the front end of the drive shaft 44, which protrudes from the front housing 41. An armature 55 is supported by a leaf spring 54a of the hub 54. A coil 56 is fixed to the front end of the front housing 41, and is disposed in the rotor 51.

As the coil 56 is energized due to the electric current, attraction based on electromagnetic force acts on the armature 55. Therefore, the armature 55 resists against the leaf spring 54a, and press-contacts on the front end surface of the rotor 51. The rotor 51 connects with the armature 55, which is in a state shown in FIG. 1, so that the driving power of the engine Eg is transmitted to the compressor CP.

In such a state, as the coil 56 is de-energized by shutting the electric current supplied to the coil 56, the attraction does not act on the armature 55. Therefore, the armature 55 moves away from the rotor 51 due to the urging force of the leaf spring 54a, and is disconnected from the rotor 51, so that the driving power of the engine Eg is not transmitted to the compressor CP.

The rotor 51, the hub 54, the armature 55 and the coil 56 constitute an electromagnetic clutch 57. The electromagnetic clutch 57 couples power between the engine Eg and the motor generator MG.

According to the air-conditioning system of the first embodiment, the electromagnetic clutch 57 is connected during the operation of the engine Eg. The motor generator MG is driven due to driving power transmitted from the engine Eg, and generates the electric power. Also, the compressor CP is driven due to the driving power transmitted from the engine Eg, and compresses the refrigerant gas.

Meanwhile, the electromagnetic clutch 57 is disconnected during the stop of the engine Eg, such as an idle stop. The engine Eg does not transmit the driving power to the motor generator MG and the compressor CP. However, the motor generator MG is driven due to the electric power supplied from the battery 50, and the compressor CP is driven through the drive shafts 6, 44.

The controller 36 opens the capacity control valve 29 and minimizes the discharge capacity of the compressor CP due to signals such as a turn-off of the air conditioner and an acceleration of the engine Eg during the operation of the engine Eg. Besides, a signal for stopping the motor generator MG corresponds to the signal of the turn-off of the air conditioner during the stop of the engine Eg.

As described above, the minimum inclination angle of the swash plate 12 is not zero. Therefore, even if the discharge capacity of the compressor CP is minimized, the refrigerant gas is drawn from the suction chamber 21 into the cylinder bores 1a, and is compressed and discharged from the cylinder bores 1a to the discharge chamber 22. Accordingly, the internal refrigerant circuit in the compressor CP is constituted of the cylinder bores 1a, the discharge chamber 22, the supply passage 28, the crank chamber 5, the bleed passage 27, the suction chamber 21 and the cylinder bores 1a in this order. Also, lubricant contained in the refrigerant gas circulates within the circuit in the compressor CP.

The motor generator MG functions as the starter upon starting the engine Eg. The controller 49 controls the motor generator MG due to the signal for starting the engine Eg by turning a key in ignition. The motor generator MG is driven due to the control in a state that the electromagnetic clutch 57 is connected. Accordingly, the driving power generated by the motor generator MG is transmitted to the engine Eg through the electromagnetic clutch 57, and the engine Eg starts.

According to the air-conditioning system in the present embodiment, when the motor generator MG starts the engine Eg, the compressor CP is driven in a state that the discharge capacity of the compressor CP is maintained below a predetermined value. For example, while the drive shaft 6 of the compressor CP is driven by the motor generator MG, the controller 36 synchronously fully opens the capacity control valve 29 due to the signal for starting the engine Eg, and minimizes the discharge capacity of the compressor CP.

As the controller 49 detects the signal for starting the engine Eg during the stop of the engine Eg and the motor generator MG, the controller 49 drives the motor generator MG at a predetermined speed during a predetermined period in a state that the electromagnetic clutch 57 is disconnected. The compressor CP is driven due to the rotation of the motor generator MG, and pressure in the discharge chamber 22 of the compressor CP increases. The controller 36 controls the capacity control valve 29 due to the signal for starting the engine Eg, and synchronously fully opens the capacity control valve. Thereby, the pressurized refrigerant gas in the discharge chamber 22 flows into the crank chamber 5, and the pressure in the crank chamber 5 increases. The inclination angle of the swash plate 12 decreases due to the increase in the pressure in the crank chamber 5, and the discharge capacity of the compressor CP is minimized. The predetermined speed and period of the motor generator MG for minimizing the discharge capacity of the compressor CP are determined based on an experiment, and are examined based on dispersion among products, then are set at necessary and sufficient level.

After the motor generator MG is driven at the predetermined speed for the predetermined period, that is, after the motor generator MG stops, the electromagnetic clutch 57 is connected due to an external control. The controller 49 drives the motor generator MG and starts the engine Eg through the electromagnetic clutch 57. To prevent a load on the motor generator MG from increasing rapidly when the electromagnetic clutch 57 is connected during the operation of the motor generator MG, the electromagnetic clutch 57 is connected after the motor generator MG stops, then the motor generator MG is driven again. The rapid increase in the load on the motor generator MG causes the motor generator MG to step out.

As the signal for starting the engine Eg is detected while the air conditioner is working and the compressor CP is driven during the idle stop, the controller 36 controls the capacity control valve 29 to fully open the capacity control valve 29 as the drive shaft 44 continues to rotate. After the controller 36 opens the capacity control valve 29, the controller 49 stops the motor generator MG after the predetermined period. The predetermined period is determined based on an experiment, at least considering the speed of the drive shaft 44, so as to minimize the discharge capacity of the compressor CP by controlling the capacity control valve 29 due to the electric current supplied from the controller 36. Therefore, the discharge capacity of the compressor CP is minimized during the stop of the motor generator MG. The electromagnetic clutch 57 is connected due to the external control after the motor generator MG stops. The controller 49 drives the motor generator MG and starts the engine Eg in a state that the electromagnetic clutch 57 is connected.

Meanwhile, while the air conditioner and the drive shaft 44 of the motor generator MG are stopping during the idle stop, the controller 49 and the controller 36 operate as well as above-described while the engine Eg and the motor generator MG are stopping. Namely, after the motor generator MG drives the compressor CP until the discharge capacity of the compressor CP is minimized, the motor generator MG stops. Then the electromagnetic clutch 57 is connected, and the motor generator MG starts the engine Eg through the electromagnetic clutch 57.

The first embodiment allows the following advantageous effects to be obtained.

(1) Since the motor generator MG is constructed as the starter for starting the engine Eg, the discharge capacity of the compressor CP is maintained below the predetermined value when the motor generator MG starts the engine Eg. Therefore, the engine Eg starts in a state that the load on the motor generator MG to drive the compressor CP is maintained below the predetermined value. According to the first embodiment, without a coupling mechanism for connecting and disconnecting the motor generator MG and the compressor CP such as an electromagnetic clutch, the load on the motor generator MG is decreased upon starting the engine Eg. Accordingly, the air-conditioning system is simply constructed, and is downsized. Also, since the load on the motor generator MG is decreased upon starting the engine Eg, the maximum load on the motor generator MG may easily be decreased. Therefore, the capacity of the motor generator MG is easily decreased as compared with a system with the compressor CP, which is driven in higher discharge capacity relative to the predetermined value when the motor generator MG starts the engine Eg. Additionally, as the load on the motor generator MG decreases, lifetime of the battery 50 lengthens, and the motor generator MG may not undesirably stop due to shortage of the electric power during the stop of the engine Eg such as the idle stop.

(2) The motor generator MG starts the engine Eg only after the discharge capacity of the compressor CP is maintained below the predetermined value by the controller 36. Namely, without reference to the present discharge capacity of the compressor CP upon starting the engine Eg, the discharge capacity of the compressor CP attains a value below the predetermined value upon starting the engine Eg. Accordingly, since the discharge capacity of the compressor CP does not need to be detected, no sensor needs to be disposed, as compared with the compressor CP, the discharge capacity of which is detected by a kind of sensor upon starting the engine Eg, and is maintained below the predetermined value if the discharge capacity exceeds the predetermined value.

(3) The discharge capacity of the compressor CP is maintained below the predetermined value by the capacity control valve 29, which is synchronously energized due to the signal for starting the engine Eg by the motor generator MG. Accordingly, the capacity control valve 29 for decreasing the discharge capacity is synchronously energized due to the signal for starting the engine Eg. Therefore, the load on the motor generator MG upon starting the engine Eg is surely decreased.

(4) The compressor CP is driven due to the driving power transmitted from the engine Eg during the operation of the engine Eg, and is selectively driven by the motor generator MG during the stop of the engine Eg. In other words, the motor generator MG is selectively energized to drive the compressor CP only during the stop of the engine Eg. Accordingly, since the load for driving the compressor CP does not act on the motor generator MG during the operation of the engine Eg, the load on the battery 50 for supplying the motor generator MG with the electric power is further decreased.

(5) The compressor CP and the motor generator MG are disposed in series and are united with each other. The respective drive shafts 6, 44 of the compressor CP and the motor generator MG are disposed in a direction of the axis L. Accordingly, such as a pulley or a belt for transmitting the driving power between the drive shafts 6, 44 does not need to be disposed, and a structure is simplified. The electromagnetic clutch 57 is disposed not in the vicinity of the engine Eg but in the vicinity of the compressor CP and the motor generator MG. Therefore, a harness for supplying the electric current to the electromagnetic clutch 57, the compressor CP and the motor generator MG may be shared.

A second embodiment of the present invention will now be described with reference to FIG. 2. An air-conditioning system in the second embodiment has the motor generator MG and the compressor CP that are separately constructed as compared with the first embodiment. The other components are similar as those of the first embodiment. The same reference numerals denote the similar components in FIG. 1.

Figure 2:
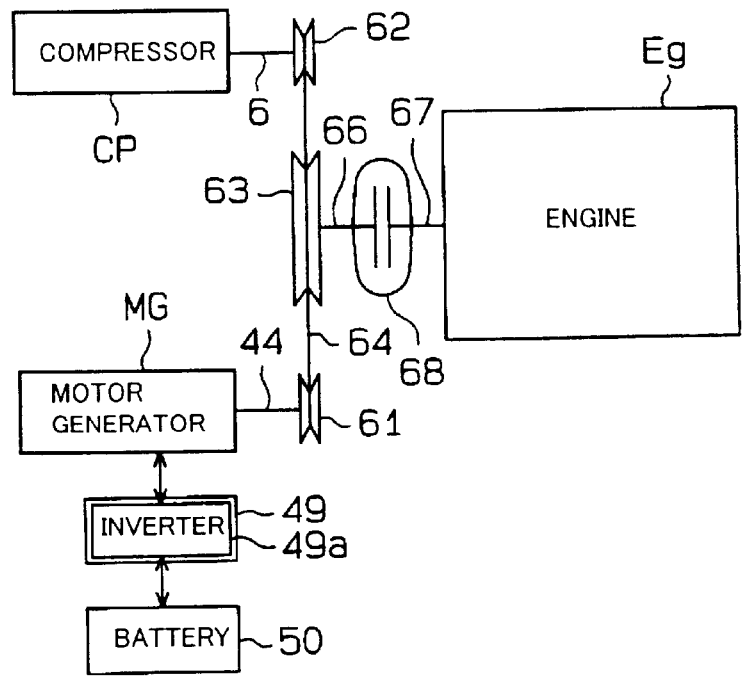
FIG. 2 is a schematic cross-sectional view illustrating an air-conditioning system for a vehicle according to a second embodiment of the present invention.

As shown in FIG. 2, the air-conditioning system in the present embodiment has the motor generator MG and the compressor CP that are separately constructed, and pulleys 61, 62 are secured to the respective drive shafts 44, 6 so as to rotate integrally with the respective drive shafts 44, 6. Each pulley 61, 62 is operatively coupled to a pulley 63 through the belt 64. In other words, the motor generator MG is always operatively coupled to the compressor CP.

The electromagnetic clutch 68 is disposed between a drive shaft 66, to which the pulley 63 is secured, and a crankshaft 67 of the engine Eg, and is operative to controllably connect and disconnect the power transmitting path between the drive shaft 66 and the crankshaft 67. The electromagnetic clutch 68 is constructed of the similar to the electromagnetic clutch 57 in the first embodiment. The electromagnetic clutch 68 has the solenoid, and is controllable in accordance with the external control.

According to the air-conditioning system in the present embodiment, since the electromagnetic clutch 68 is connected during the operation of the engine Eg, the motor generator MG is driven due to the driving power transmitted from the engine Eg, and generates the electric power. Also, the compressor CP is driven due to the driving power transmitted from the engine Eg, and compresses the refrigerant gas.

Meanwhile, since the electromagnetic clutch 68 is disconnected during the stop of the engine Eg such as the idle stop, the power transmitting path between the motor generator MG and the engine Eg and between the compressor CP and the engine Eg are disconnected. The motor generator MG is energized due to the electric power supplied from the battery 50, and the compressor CP is driven by the motor generator MG.

As the controller 36 controls the discharge capacity of the compressor CP so as to attain a value below the predetermined value during the stop of the engine Eg, the electromagnetic clutch 68 is connected after the motor generator MG stops. Then the motor generator MG starts the engine Eg.

According to the present embodiment, the pulleys 61, 62, 63, the belt 64, the rotary shaft 66 and the electromagnetic clutch 68 couple power between the engine Eg and the motor generator MG and between the engine Eg and the compressor CP.

The following advantageous effects are further obtained in the second embodiment in addition to the paragraphs (1) through (4) in the first embodiment.

(6) The motor generator MG and the compressor CP are separated from each other. Therefore, each unit of the motor generator MG and the compressor CP is downsized, and is distributed into small spaces. Therefore, the units MG, CP may be located more selectively than the combined unit of MG and CP.

The present invention is not limited to the embodiments described above, but may be modified into the following examples.

Figure 3:
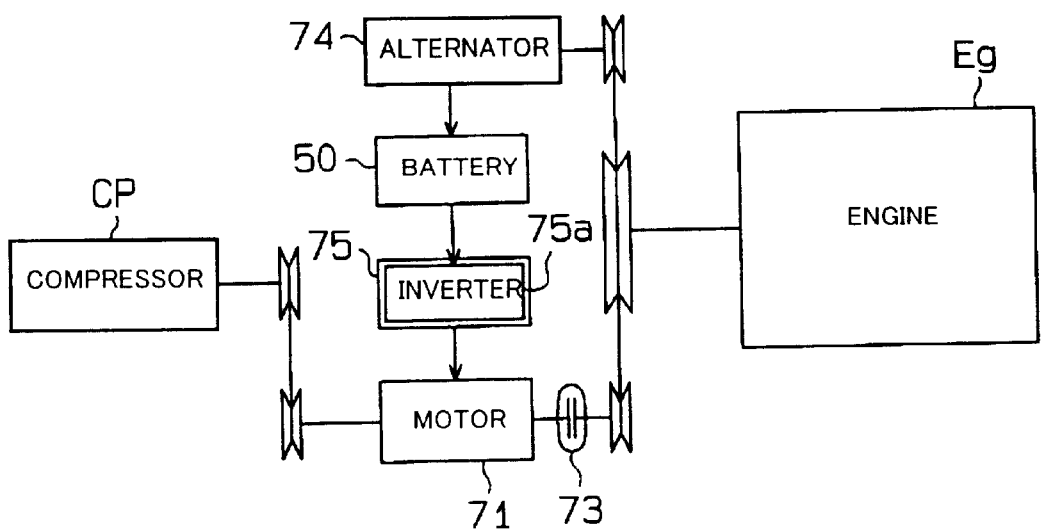
FIG. 3 is a schematic cross-sectional view illustrating an air-conditioning system for a vehicle according to another embodiment of the present invention.

One of the motor generator MG and the engine Eg drives the compressor CP in the first and second embodiments, but the compressor CP may be driven by the motor generator MG only. The structure in this case is shown in FIG. 3. According to the structure, the compressor CP is always operatively coupled to a motor 71. Additionally, the motor 71 and the engine Eg are coupled through the electromagnetic clutch 73 such that the electromagnetic clutch 73 is operative to controllably connect and disconnect the power transmitting path between the motor 71 and the engine Eg. An alternator 74 is always operatively coupled to the engine Eg, and generates the electric power to charge the battery 50 by receiving the driving power of the engine Eg. The electric power accumulated in the battery 50 is supplied to the motor 71 through an inverter 75a in a motor controller 75. The motor 71 may be energized to drive the compressor CP and to start the engine Eg due to the electric power supplied from the battery 50. Besides, while the motor 71 is driving the compressor CP, the electromagnetic clutch 73 disconnects the power transmitting path between the motor 71 and the engine Eg due to the external control command. Meanwhile, when the motor 71 starts the engine Eg, the electromagnetic clutch 73 connects the power transmitting path between the motor 71 and the engine Eg due to the external control command after the discharge capacity of the compressor CP attains a value below the predetermined value. Thereby, the motor 71 starts the engine Eg. When the compartment needs to be cooled, the controller 75 converts a direct current accumulated in the battery 50 to an alternating current by means of the inverter 75a, and supplies the motor 71 with the alternating current, then drives the compressor CP by rotating the motor 71. According to the structure, the air-conditioning system is simplified and downsized by omitting a coupling mechanism operative to controllably connect and disconnect the power transmitting path between the motor 71 and the compressor CP, such as an electromagnetic clutch. Since the load on the motor 71 decreases upon starting the engine Eg, the capacity of the motor 71 may easily be decreased as compared with a structure that the discharge capacity of the compressor CP is higher than the predetermined value upon starting the engine Eg by the motor 71. Also, as the load on the motor 71 decreases, the lifetime of the battery 50 may lengthen, and the motor 71 may not stop due to the shortage of the electric power during the stop of the engine Eg such as the idle stop.

According to the first and second embodiments, the motor generator MG is permitted to start the engine Eg only after the discharge capacity of the compressor CP attains a value below the predetermined value. However, timing for controlling the discharge capacity may diversely be varied other than upon starting the engine Eg. For example, the discharge capacity of the compressor CP is maintained below the predetermined value just before the engine Eg stops while one of the engine Eg and the motor generator MG is driving the compressor CP. Also, the discharge capacity of the compressor CP is maintained below the predetermined value after the engine Eg stops while to the motor generator MG is driving the compressor CP. Thereby, after the engine Eg stops, the motor generator MG drives the compressor CP upon starting the engine Eg in a state that the discharge capacity of the compressor CP is maintained below the predetermined value.

The discharge capacity of the compressor CP does not need to be synchronously controlled due to the signal for starting the engine Eg. For example, a signal for stopping the engine Eg is given when the engine Eg stops, and the discharge capacity of the compressor CP is synchronously controlled due to the signal for stopping the engine Eg. For example, the discharge capacity of the compressor CP is maintained below the predetermined value just before the engine Eg stops while one of the engine Eg and the motor generator MG is driving the compressor CP. Also, the discharge capacity of the compressor CP is maintained below the predetermined value after the engine Eg stops while the motor generator MG is driving the compressor CP.

When the motor generator MG starts the engine Eg during the stop of the engine Eg, either energizing the capacity control valve 29 for controlling the discharge capacity of the compressor CP or driving the drive shaft 6 may start first, and may also simultaneously start.

When the motor generator MG starts the engine Eg, the discharge capacity of the compressor CP does not need to be the minimum discharge capacity. As long as the discharge capacity of the compressor CP is in an allowable range and corresponds to the load on the motor generator MG based on the discharge capacity of the motor generator MG and the lifetime and the capacity of the battery 50, the discharge capacity of the compressor CP may be higher than the minimum discharge capacity.

According to the first and second embodiments, the electromagnetic clutch 57 or 68 is energized to connect the power transmission path between the engine Eg and the motor generator MG during the stop of the motor generator MG upon starting the engine Eg. However, the electromagnetic clutch 57 or 68 may be energized during the operation of the motor generator MG without stopping. In case the motor generator MG steps out, the load on the motor generator MG may be inhibited from increasing when the electromagnetic clutch 57 or 68 is connected.

The present invention may be applied to a scroll type compressor, such as a variable displacement scroll type compressor disclosed in Japanese Unexamined Patent Publication No. 11-324930, instead of the variable displacement compressor CP, which compresses the refrigerant gas by the reciprocation of the piston 20.

The present invention may be applied to a compressor, which wobbles a cam plate relatively rotatably supported by a drive shaft such as a wobble plate type compressor, instead of the variable discharge capacity compressor CP, the swash plate 12 or a cam plate of which integrally rotates with the ho drive shaft 6.

According to the first embodiment, the compressor CP is operatively coupled to the engine Eg through the power transmitting path downstream to the motor generator MG. The present invention is not limited to the embodiments described above, the compressor CP may operatively be coupled to the engine Eg through the power transmitting path upstream to the motor generator MG. In other words, the compressor CP and the motor generator MG may be transposed.

Another rotary device may operatively be coupled to the motor generator MG in addition to the compressor CP. For example, a hydraulic pump for a power assist type brake mechanism, a hydraulic pump for a power steering wheel, an air pump for an air suspension device, a pump for circulating coolant in a cooling system for cooling the engine Eg, the motor generator MG and the battery 50, whatever the device that is driven due to the driving power inputted from the outside may operatively be coupled to the motor generator MG. Preferably, while another rotary device is operatively coupled to the motor generator MG in addition to the compressor CP, and while the compressor CP does not need to be driven and the rotary device needs to be driven, the rotary device other than the compressor CP is driven in a state that the discharge capacity of the compressor CP is maintained below the predetermined value.

The present invention may be applied to a go vehicle driven by a hybrid engine, too.

According to the present invention described above, the air-conditioning system is simply constructed and downsized.

Therefore, the present examples and embodiments are to be considered as illustrative and not restrictive and the invention is not to be limited to the details given herein, but may be modified within the scope of the appended claims.

What is claimed is:

1. An air-conditioning system for a vehicle including a refrigerant circuit and an engine, comprising:
    a compressor in the refrigerant circuit;
    a battery;
    an electric motor connected to the compressor when energized by the battery;
    a mechanism operative to controllably connect and disconnect a power transmitting path between the engine and the motor;
    a first controller operative to control the electric power supplied to the motor from the battery; and
    a capacity control mechanism responsive to the controller to maintain the discharge capacity of the compressor below a predetermined value upon starting the engine by the motor.

2. The air-conditioning system according to claim 1, wherein the motor is permitted to start the engine only after the discharge capacity attains a value below the predetermined value.

3. The air-conditioning system according to claim 2, wherein the compressor has a control chamber, the displacement of the compressor varies in accordance with variation of pressure in the control chamber, and the capacity control mechanism comprises:
    a capacity control valve controllable in accordance with an external command to adjust the pressure in the control chamber; and
    a second controller operative to provide an external command to the capacity control valve synchronously with receiving a signal for starting the engine so as to maintain the discharge capacity of the compressor below the predetermined value.

4. The air-conditioning system according to claim 2, wherein the compressor has a control chamber, the discharge capacity of the compressor varies in accordance with variation of pressure in the control chamber, and the capacity control mechanism comprises:
    a capacity control valve controllable in accordance with an external command to adjust the pressure in the control chamber; and
    a second controller operative to provide an external command to the capacity control valve synchronously with receiving a signal for stopping the engine so as to maintain the discharge capacity of the compressor below the predetermined value.

5. The air-conditioning system according to claim 1, wherein the compressor is operatively connected to the engine, during operation of the engine, and the motor is selectively energized to drive the compressor when the engine is inoperative.

6. The air-conditioning system according to claim 1, wherein a drive source of the compressor is the motor only.

7. The air-conditioning system according to claim 1, wherein the compressor and the motor are united with each other.

8. The air-conditioning system according to claim 1, wherein the compressor and the motor are separated from each other.

9. The air-conditioning system according to claim 1, wherein the capacity control mechanism maintains the discharge capacity of the compressor at the minimum value of discharge capacity upon starting the engine by the motor.

10. An air-conditioning system for a vehicle including a refrigerant circuit and an engine, comprising:
    a compressor in the refrigerant circuit;
    a battery;
    an electric motor connected to the compressor when energized by the battery;
    a first controller operative to control the electric power supplied to the motor from the battery; and
    a capacity control mechanism responsive to the controller to maintain the discharge capacity of the compressor below a predetermined value upon starting the engine by the motor.

11. The air-conditioning system according to claim 10, wherein the motor is permitted to start the engine only after the discharge capacity attains a value below the predetermined value.

12. The air-conditioning system according to claim 11, wherein the compressor has a control chamber, the displacement of the compressor varies in accordance with variation of pressure in the control chamber, and the capacity control mechanism comprises:
    a capacity control valve controllable in accordance with an external command to adjust the pressure in the control chamber; and
    a second controller operative to provide an external command to the capacity control valve synchronously with receiving a signal for starting the engine so as to maintain the discharge capacity of the compressor below the predetermined value.

13. The air-conditioning system according to claim 11, wherein the compressor has a control chamber, the displacement of the compressor varies in accordance with variation of pressure in the control chamber, and the capacity control mechanism comprises:

a capacity control valve controllable in accordance with an external command to adjust the pressure in the control chamber; and a second controller operative to provide an external command to the capacity control valve synchronously with receiving a signal for stopping the engine so as to maintain the discharge capacity of the compressor below the predetermined value of discharge capacity.

14. The air-conditioning system according to claim 10, further comprising:

a mechanism operative to controllably connect and disconnect a power transmitting path between the engine and the motor; and wherein the compressor is operatively connected to the engine during operation of the engine, and the motor is selectively energized to drive the compressor when the engine is inoperative.

15. The air-conditioning system according to claim 10, wherein the compressor is operatively connected to the motor only.

16. The air-conditioning system according to claim 10, wherein the compressor and the motor are united with each other.

17. The air-conditioning system according to claim 10, wherein the compressor and the motor are separated from each other.

18. The air-conditioning system according to claim 10, wherein the capacity control mechanism maintains the discharge capacity of the compressor at the minimum value upon starting the engine by the motor.

19. A method for controlling an air-conditioning system for a vehicle including a refrigerant circuit and an engine, comprising the steps of:

receiving a signal for starting the engine;

maintaining the discharge capacity of a compressor in the refrigerant circuit below a predetermined value;

supplying an electric motor operatively connected to the compressor with electric power; and starting the engine by the motor.

20. The method for controlling the air-conditioning system according to claim 19, further comprising the steps of:

supplying a capacity control valve with the electric power synchronously with receiving the signal for starting the engine;

varying the opening size of the capacity control valve; and adjusting pressure in a crank chamber.

21. The method for controlling the air-conditioning system according to claim 19, further comprising the steps of:

supplying the capacity control valve with the electric power synchronously with receiving the signal for stopping the engine;

varying the opening size of the capacity control valve; and adjusting pressure in a crank chamber.

22. The method for controlling the air-conditioning system according to claim 19, further comprising the steps of:

driving the compressor by the engine during operation of the engine; and driving the compressor by the motor during a stop of the engine when necessary.

23. The method for controlling the air-conditioning system according to claim 19, further comprising the step of connecting a power transmitting path between the engine and the motor.

* * * * *